United States Patent
Maktedar

(10) Patent No.: US 7,689,932 B2
(45) Date of Patent: Mar. 30, 2010

(54) MAINTENANCE OF SHORTCUT KEYS IN A MOBILE DEVICE

(75) Inventor: Rishikesh Maktedar, Tampere (FI)

(73) Assignee: Nokia Corporation, Espoo (FI)

( * ) Notice: Subject to any disclaimer, the term of this patent is extended or adjusted under 35 U.S.C. 154(b) by 795 days.

(21) Appl. No.: 11/023,657

(22) Filed: Dec. 28, 2004

(65) Prior Publication Data

US 2006/0143578 A1  Jun. 29, 2006

(51) Int. Cl.
G06F 3/048 (2006.01)
G06F 3/14 (2006.01)
G06F 3/02 (2006.01)

(52) U.S. Cl. .............. 715/825; 715/810; 715/811; 715/813; 715/847; 715/864; 345/172

(58) Field of Classification Search ......... 715/810, 715/847, 827, 811, 813, 825, 864; 345/172
See application file for complete search history.

(56) References Cited

U.S. PATENT DOCUMENTS

| | | | |
|---|---|---|---|
| 5,630,159 A | 5/1997 | Zancho | |
| 5,867,729 A * | 2/1999 | Swonk | 710/8 |
| 6,834,294 B1 * | 12/2004 | Katz | 709/203 |
| 2001/0035882 A1 * | 11/2001 | Stoakley et al. | 345/779 |
| 2002/0077156 A1 * | 6/2002 | Smethers | 455/566 |
| 2002/0099895 A1 * | 7/2002 | Landron et al. | 710/303 |
| 2002/0114447 A1 * | 8/2002 | Ooya et al. | 379/433.09 |
| 2004/0119755 A1 * | 6/2004 | Guibourge | 345/827 |
| 2005/0015389 A1 * | 1/2005 | Novak et al. | 707/100 |
| 2005/0081164 A1 * | 4/2005 | Hama et al. | 715/830 |
| 2006/0026572 A1 * | 2/2006 | Srivastava | 717/136 |
| 2006/0064406 A1 * | 3/2006 | Ehrich et al. | 707/3 |
| 2007/0152957 A1 * | 7/2007 | Shibata | 345/156 |

* cited by examiner

*Primary Examiner*—Joshua D Campbell
*Assistant Examiner*—Stephen Alvesteffer
(74) *Attorney, Agent, or Firm*—Foley & Lardner, LLP

(57) ABSTRACT

A device and method provide for maintenance of a shortcut key to an application accessible at the device. The method includes assigning a first application to a shortcut key at a device, wherein the shortcut key at the device is a button on the device; storing an identifier of the first application to a first file at the device; determining if the first application at the device assigned to the shortcut key remains executable at the device; if the first application is determined to be unexecutable at the device, assigning a second application to the shortcut key at the device, wherein an identifier of the second application is stored in a second file at the device, and further wherein the second application is executable at the device.

16 Claims, 4 Drawing Sheets

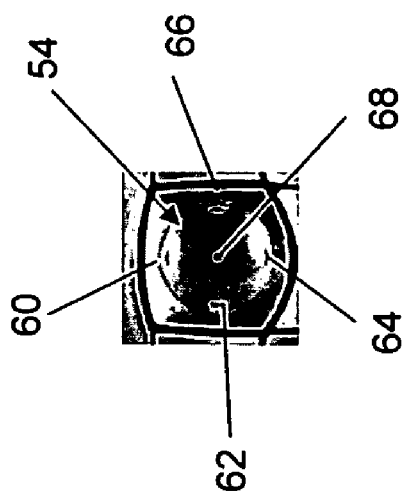
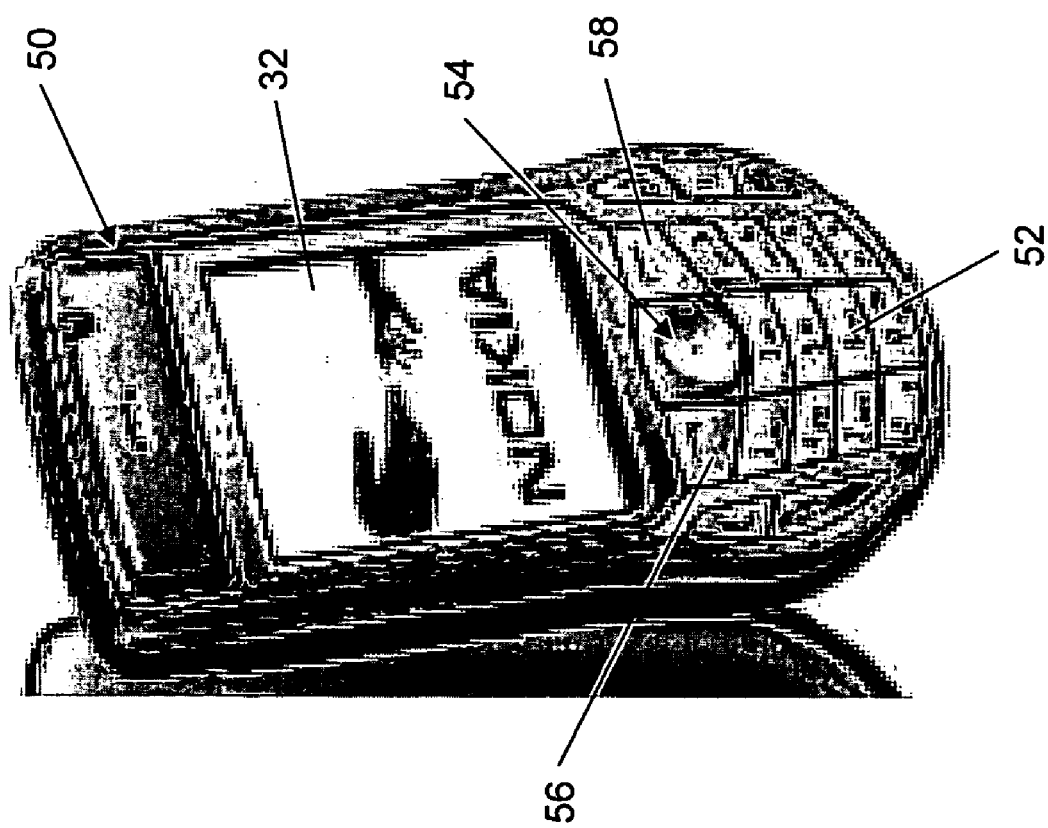
FIG. 4
FIG. 3

MAINTENANCE OF SHORTCUT KEYS IN A MOBILE DEVICE

FIELD OF THE INVENTION

The present invention is related to the maintenance of shortcut keys. More specifically, the present invention relates to the maintenance of application shortcut keys in a mobile device.

BACKGROUND OF THE INVENTION

In addition to processing voice calls from traditional wired and wireless phones, mobile communication devices now also communicate with other types of devices such as computers of all form factors, Personal Data Assistants (PDAs) or handheld PCs, Integrated Messaging Devices (IMD), etc. Additionally, communication devices have merged the capabilities of cellular telephones, PDAs, IMDs, and computing devices and now provide increasingly sophisticated applications. These applications provide, for example, advanced telephony, various messaging services such as e-mail, short messaging, multi-media messaging, instant messaging and presence, Internet browsers, mobile wallets, image viewing, video and image recording and viewing, etc. Thus, applications provide the communication device with the ability to perform a wide variety of tasks. An application is an organized list of instructions that, when executed, cause the communication device to perform a user selected function. The term "execution" is the process of running an application or the carrying out of the operation called for by an instruction.

A user executes an application by selecting the application for launch. Launching the application generally requires retrieving the executable from a permanent memory device and copying the executable to a temporary memory device. The temporary memory device is generally some form of random access memory (RAM). The RAM or system memory holds the operating system and executing applications so that they can be reached quickly by the computer's processor. The user may select the application using a graphical user interface and navigation tools to move among various selections. However, communication devices generally are small and lightweight because the desire is for an easily portable device. As a result, the display and the navigation tools are small and generally more tedious to use. The devices generally include various keys or buttons to facilitate input to the device. To simplify selection of an application for execution, one or more shortcut key may be defined. A shortcut key is a single key press or combination of key presses that cause a device to perform an action such as execution of an application.

In mobile devices, a menu for accessing applications is generally provided. Pressing an "Application" key opens the applications menu, where the user may browse using navigation tools and may select an application for execution. Applications are presented as a grid of items by default though the user can choose to use a list presentation. When the application menu is opened, the numeric keys 1-9 can be used as shortcut keys to select an application. The keys are mapped directly to the first nine icons in the application menu. The menu contains all of the installed applications. Additionally, an application may be selected for execution after assigning a shortcut key to the application.

Mobile devices have limited on-board memory for storing applications. A Multi-Media Card (MMC) is a postage stamp-sized flash memory card that allows data to be saved onto it. MMCs are a means of exchanging data between PDAs, phones, digital cameras, and other devices and can also act similar to a hard drive on a PC for the storage of data and programs. Thus, MMCs provide a mechanism for executing applications stored on the MMC. The user inserts an MMC into the device and can access the application stored on the MMC. A user can plug different MMCs into the device to execute different applications. "Hot swap" of an MMC can be used in devices to enable removing and inserting of an MMC without powering off the device. As a result, the applications available for execution may change dynamically. Shortcut keys to the application must recognize that the applications available have changed. Previous implementations remember two applications in each memory card based on a memory card identifier and application information. However, this requires memory that may never be used again if the MMC is never used again. Additionally, such an implementation does not recognize that the same application may be used from different MMCs wasting additional memory resources. As a further limitation, neither MMC may be inserted in the device resulting in a shortcut key that does not function. What is needed, therefore, is a method of defining an application for a shortcut key that avoids a shortcut definition that does not work.

SUMMARY OF THE INVENTION

An exemplary embodiment of the invention relates to a method for maintaining a shortcut key to an application accessible at a device. The method includes, but is not limited to, assigning a first application to a shortcut key at a device, wherein the shortcut key at the device is a button on the device; storing an identifier of the first application to a first file at the device; determining if the first application at the device assigned to the shortcut key remains executable at the device; if the first application is determined to be unexecutable at the device, assigning a second application to the shortcut key at the device, wherein an identifier of the second application is stored in a second file at the device, and further wherein the second application is executable at the device Another exemplary embodiment of the invention relates to one or more computer-readable media having computer-readable instructions stored thereon that, upon execution by a processor, cause the processor to maintain a shortcut key to an application accessible at a device. The instructions are configured to assign a first application to a shortcut key at a device, wherein the shortcut key at the device is a button on the device; store an identifier of the first application to a first file at the device; determine if the first application at the device assigned to the shortcut key remains executable at the device; if the first application is determined to be unexecutable at the device, assign a second application to the shortcut key at the device, wherein an identifier of the second application is stored in a second file at the device, and further wherein the second application is executable at the device.

Still another exemplary embodiment of the invention relates to a device for maintaining a shortcut key to an application accessible at a device. The device includes a shortcut key, a first file, a second file, a first application, a second application, a utility, a memory, and a processor. The shortcut key is a button on the device. The first application is removable from the device. The utility includes, but is not limited to, computer code configured to assign the first application to the shortcut key; to store an identifier of the first application to the first file; to determine if the first application assigned to the shortcut key remains executable at the device; if the first application is determined to be unexecutable at the device, to assign the second application to the shortcut key, wherein an identifier of the second application is stored in the second file, and further wherein the second application is executable at the device. The memory stores the utility, the first file, and the second file. The processor couples to the memory and is configured to execute the utility.

Other principal features and advantages of the invention will become apparent to those skilled in the art upon review of the following drawings, the detailed description, and the appended claims.

BRIEF DESCRIPTION OF THE DRAWINGS

The exemplary embodiments will hereafter be described with reference to the accompanying drawings, wherein like numerals will denote like elements.

FIG. 3 is an illustration of an input interface and a display of an exemplary device in accordance with FIG. 2.

FIG. 4 is an illustration of a five-way scroll button of the input interface of FIG. 3.

DETAILED DESCRIPTION OF THE EXEMPLARY EMBODIMENTS

Figure 1:
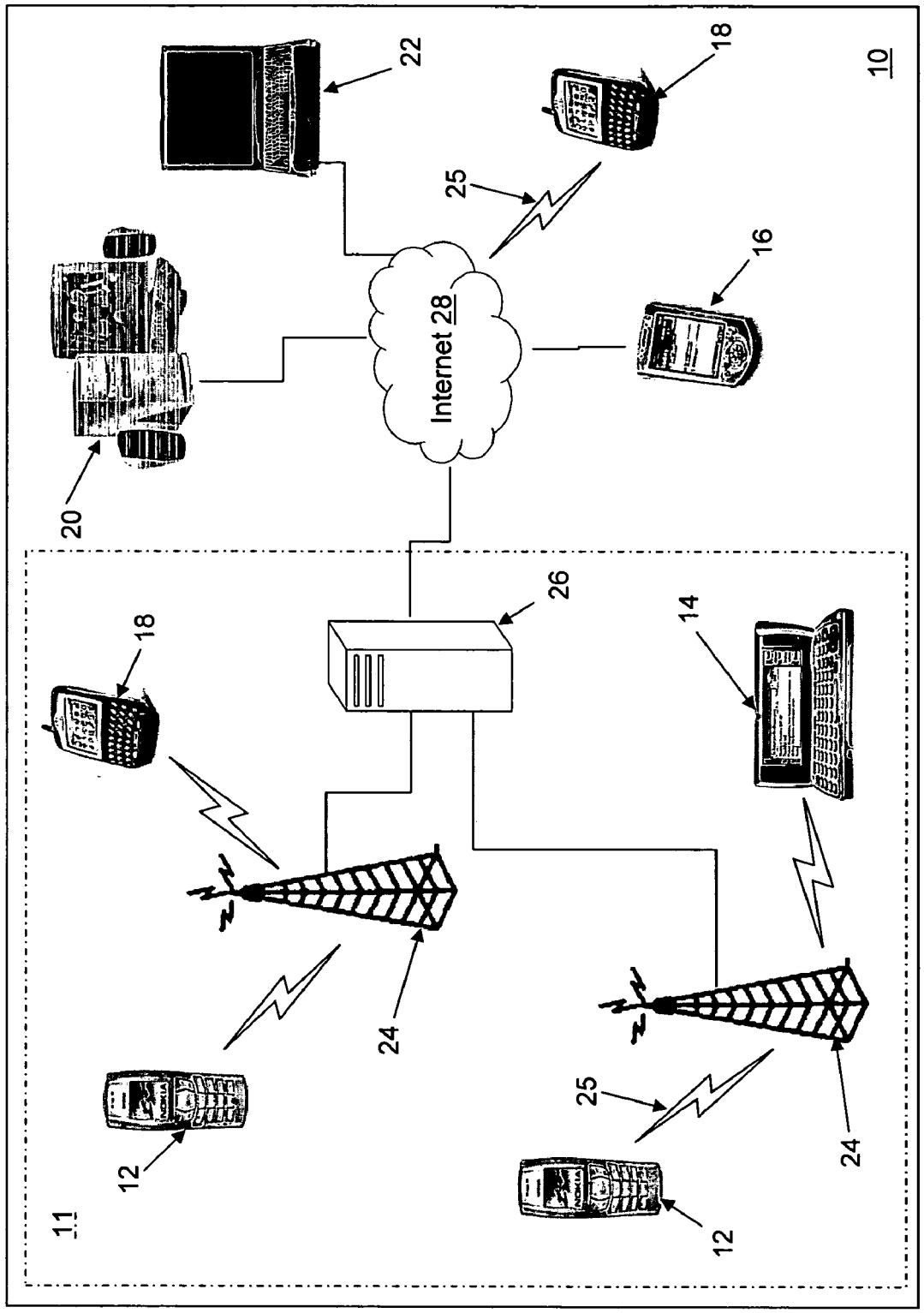
FIG. 1 is an overview diagram of a system in accordance with a exemplary embodiment.

With reference to FIG. 1, the system 10 is comprised of multiple communication devices that can communicate through a network. The system 10 may comprise any combination of wired or wireless networks including, but not limited to, a cellular telephone network, a wireless Local Area Network (LAN), a Bluetooth personal area network, an Ethernet LAN, a token ring LAN, a wide area network, the Internet, etc. The system 10 may include both wired and wireless communication devices. For exemplification, the system 10 shown in FIG. 1 includes a cellular telephone network 11 and the Internet 28. Connectivity to the Internet 28 may include, but is not limited to, long range wireless connections, short range wireless connections, and various wired connections including, but not limited to, telephone lines, cable lines, power lines, and the like.

The exemplary communication devices of system 10 may include, but are not limited to, a cellular telephone 12, a combination PDA and cellular telephone 14, a PDA 16, an IMD 18, a desktop computer 20, and a notebook computer 22. The communication devices may be stationary or mobile as when carried by an individual who is moving. Some or all of the communication devices may send and receive calls and messages and communicate with service providers through a wireless connection 25 to a base station 24. The base station 24 may be connected to a network server 26 that allows communication between the cellular telephone network 11 and the Internet 28. The system 10 may include additional communication devices and communication devices of different types.

The communication devices may communicate using various transmission technologies including, but not limited to, Code Division Multiple Access (CDMA), Global System for Mobile Communications (GSM), Universal Mobile Telecommunications System (UMTS), Time Division Multiple Access (TDMA), Transmission Control Protocol/Internet Protocol (TCP/IP), Short Messaging Service (SMS), Multimedia Messaging Service (MMS), e-mail, Instant Messaging Service (IMS), Bluetooth, IEEE 802.11, etc. A communication device may communicate using various media including, but not limited to, radio, infrared, laser, cable connection, and the like.

Figure 2:
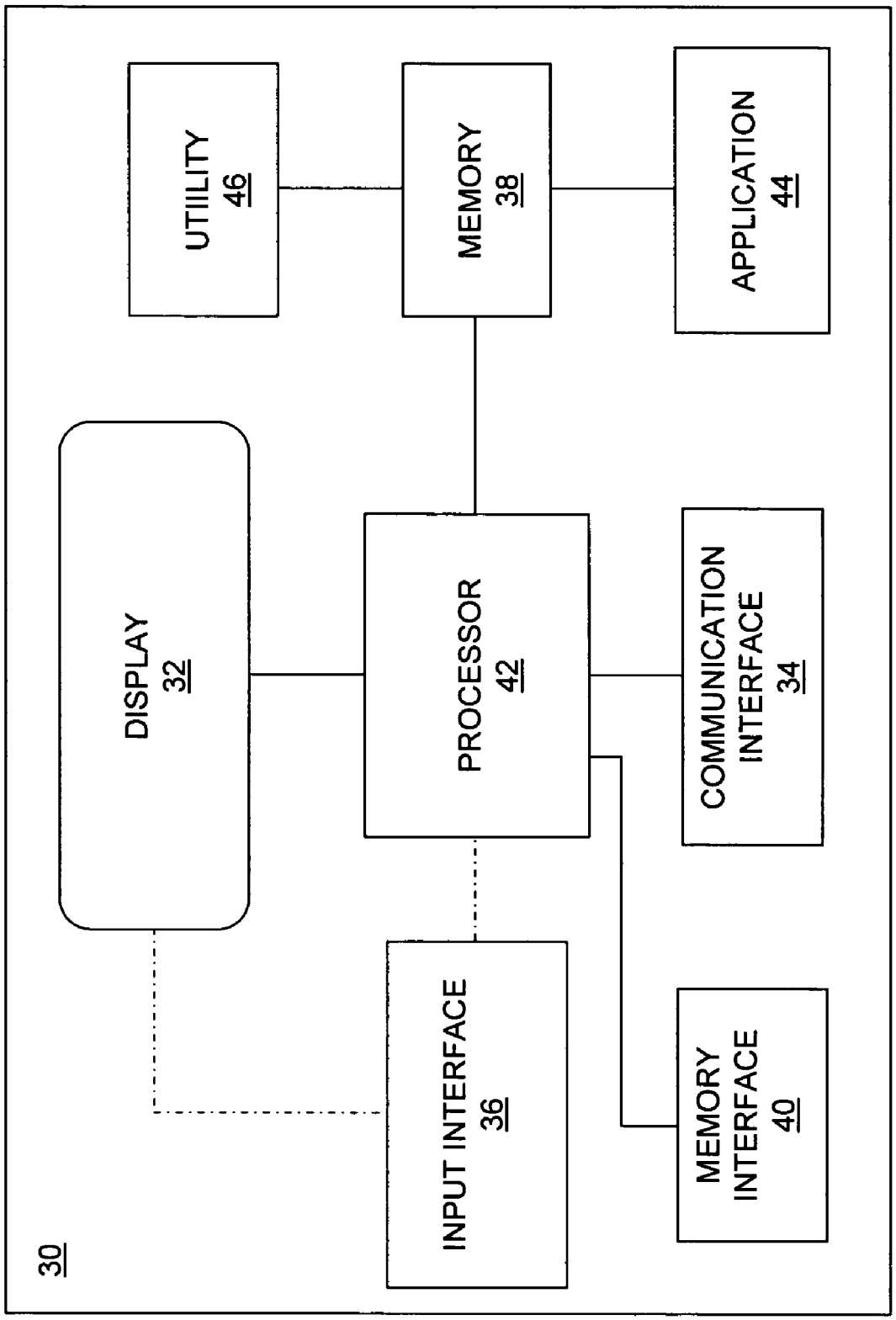
FIG. 2 is a block diagram of a device in accordance with a exemplary embodiment.

In an exemplary embodiment, the device 30, as shown in FIG. 2, comprises a display 32, a communication interface 34, an input interface 36, a memory 38, a memory interface 40, a processor 42, an application 44, and a utility 46. Different and additional components of device 30 may be incorporated into the device 30 and/or the system 10 as long as the utility 46 can be implemented in the device 30. Additionally, the device 30 need not include all of the components depicted in FIG. 2.

The display 32 presents information to a user. The display 32 may be, but is not limited to, a thin film transistor (TFT) display, a light emitting diode (LED) display, a Liquid Crystal Display (LCD), a Cathode Ray Tube (CRT) display, etc.

The communication interface 34 provides an interface for receiving and transmitting calls, messages, and any other information communicable between devices. The communication interface 34 may use various transmission technologies including, but not limited to, CDMA, GSM, UMTS, TDMA, TCP/IP, SMS, MMS, e-mail, IMS, Bluetooth, IEEE 802.11, and the like to transfer content to and from the device. The communication interface 34 is optional.

The input interface 36 provides an interface for receiving information from the user for entry into the device 30. The input interface 36 may use various input technologies including, but not limited to, a keyboard, a pen and touch screen, a mouse, a track ball, a touch screen, a keypad, one or more buttons, etc. to allow the user to enter information into the device 30 or to make selections. The input interface 36 may provide both an input and output interface. For example, a touch screen both allows user input and presents output to the user. An exemplary device 50 is shown with reference to FIG. 3. The exemplary device 50 includes the display 32, a numeric keypad 52, a five-way scroll button 54, a left soft key button 56, a right soft key button 58. The numeric keypad 52 includes 10 buttons labeled with the numbers 1, 2, 3, 4, 5, 6, 7, 8, 9, and 0. One or more of the 10 buttons may further include a sequence of alphabetic characters. With reference to FIG. 4, the five-way scroll button 54 includes an up depression point 60, a left depression point 62, a down depression point 64, a right depression point 66, and a select depression point 68. The numeric keypad 52, the five-way scroll button 54, the left soft key button 56, and the right soft key button 58 are example components of an example input interface 36.

The memory 38 is the electronic holding place for the operating system, the application 42, other applications, data, and/or the template utility 44 so that the information can be reached quickly by the computer's processor 40. The terminal may have one or memory 38 using different memory technologies including, but not limited to, Random Access Memory (RAM), Read Only Memory (ROM), flash memory, and the like. The data in RAM is volatile meaning that it remains only as long as the device is turned on. When the device is turned off, RAM loses its data. The values stored in ROM are always there, whether the device is on or not. For this reason, it is called non-volatile memory. Flash memory is a type of constantly-powered non-volatile memory that can be erased and reprogrammed in units of memory called blocks.

The memory interface 40 provides an interface for connecting an external memory to the device 30. For example, the memory interface may provide an interface to an MMC. The processor 42 may retrieve a set of instructions such as the application 44 or the utility 46 from a non-volatile or a permanent memory and copy the instructions in an executable form to a temporary memory. The temporary memory is generally some form of RAM. The term "execution" is the process of running an application or a utility or the carrying out of the operation called for by an instruction. The processor 42 executes an application or a utility, meaning that it performs the operations called for by that instruction set. The processor 40 may be implemented as a special purpose computer, logic circuits, hardware circuits, etc. Thus, the processor 40 may be implemented in hardware, firmware, software, or any combination of these methods. The processor 40 may execute, for example, the application 44 from either the memory 38 or through the memory interface 40.

The application 44 is an organized set of instructions that, when executed, cause the communication device 30 to behave in a predetermined manner. The application 44 may include, but is not limited to, a word processor application, a spreadsheet application, a presentation tool application, a video player/recorder application, an audio player/recorder application, an image editor/viewer application, an Internet browser application, a directory file system browser application, a messaging application such as an e-mail, an instant messaging application, or a facsimile application, a scheduling application, a contacts application, etc. The instructions may be written using one or more programming languages, assembly languages, scripting languages, etc.

The application 44, the utility 46, the operating system, and other applications may be executed by the same processor 42. Alternatively, the application 44, the utility 46, the operating system, and other applications may be executed by different processors. The application 44, the utility 46, the operating system, and other applications may be written in the same or different computer languages including, but not limited to high level languages, scripting languages, assembly languages, etc.

Figure 5:
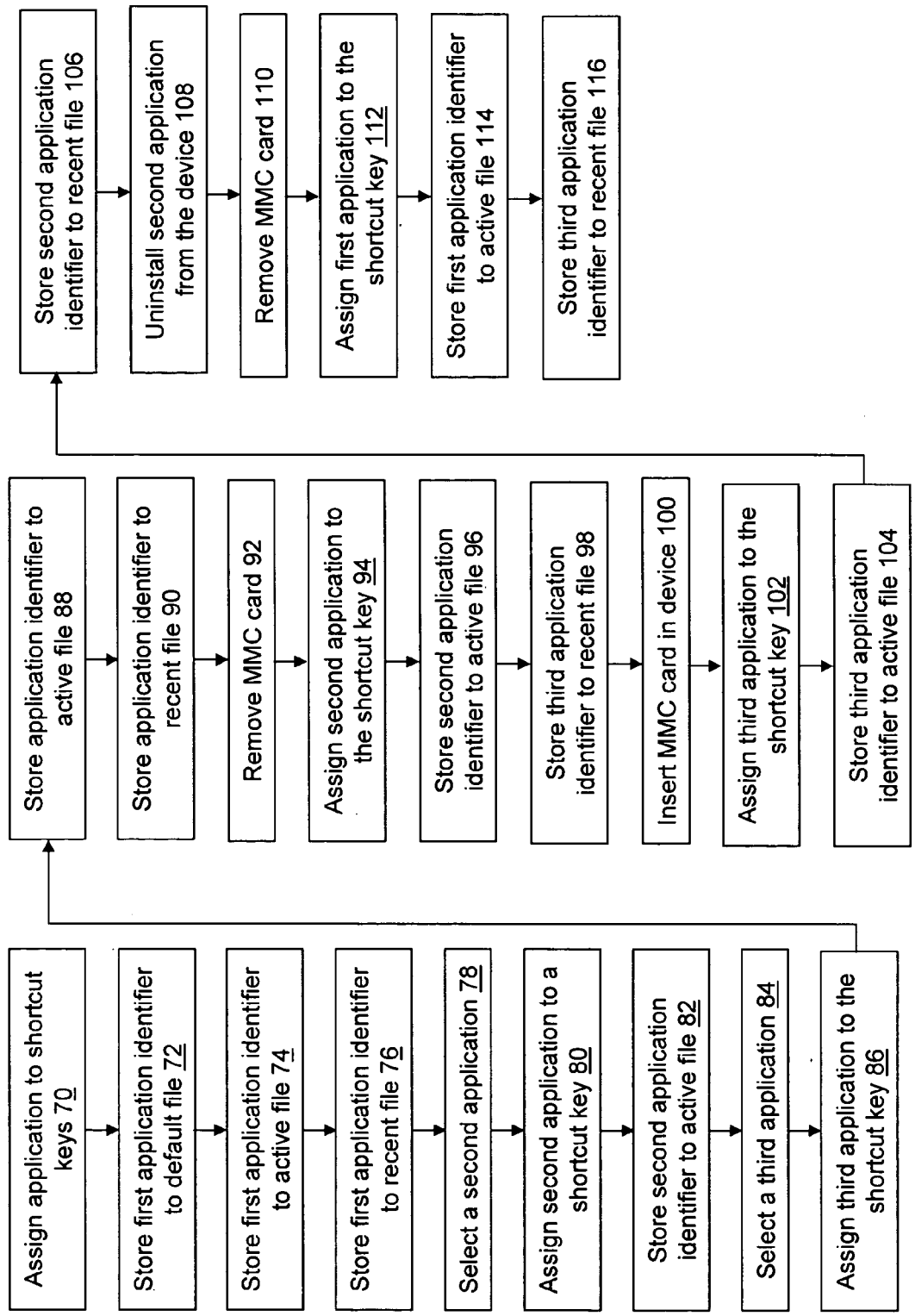
FIG. 5 is a flowchart in accordance with an exemplary embodiment.

FIG. 5 illustrates an operational flow of the utility 46 in accordance with an exemplary embodiment. It is assumed in the example that the five-way scroll button 54, the left soft key button 56, and the right soft key button 58 are implemented as a set of seven shortcut keys. In an operation 70, the user of the device 30 assigns an application to each shortcut key. These initial application selections may be identified as "default" applications that generally permanently reside in the device 30. To make the assignments, the user opens a list of applications residing in the device 30 including those applications executed from an MMC. Through the list, the user can change the "default" application assigned to each shortcut key. Thus, for example, the left soft key button 56 may have an application identified as "camera" assigned as the "default" application. At an operation 72, an identifier of the "camera" application is stored in a first file possibly denoted as the "default" file. At an operation 74, the identifier of the "camera" application also is stored in a second file possibly denoted as the "active" file. At an operation 76, the identifier of the "camera" application also is stored in a third file possibly denoted as the "requested" file.

At an operation 78, the user selects a second application, for example, downloaded from the Internet and installed in memory 38 using an SIS file. For example, the second application is a "dart" program. The user opens the list of applications residing in the device 30 including the installed "dart" program. Through the list, at an operation 80, the user changes the "active" application assigned to the left soft key button 56 to the "dart" program. At an operation 82, an identifier of the "dart" application is stored in the "active" file. At an operation 84, an identifier of the "dart" application is also stored in the "requested" file and the identifier of the "camera" application is moved from the "requested" file to a fourth file possibly denoted as the "recent" file.

At an operation 86, the user selects a third application, for example, installed on an MMC executable through the memory interface 40. For example, the second application is a "game" program. The user opens the list of applications residing in the device 30 including the "game" program. Through the list, at an operation 88, the user changes the "active" application assigned to the left soft key button 56 to the "game" program. At an operation 90, the "game" program identifier is also stored in the "requested" file. At an operation 92, the identifier of the "game" application also is stored in the "active" file. At an operation 94, the identifier of the "dart" application is moved from the "requested" file into the "recent" file.

At an operation 96, the MMC storing the "game" program is removed from the device 30, without rebooting the device 30. At an operation 98, the left soft key button 56 is automatically assigned to the "dart" program identifier stored in the "recent" file. At an operation 100, the identifier of the "dart" application is stored in the "active" file. The identifier of the "game" application remains stored in the "requested" file.

At an operation 102, the MMC card having the "game" application is inserted in the device 30. At an operation 104, the left soft key button 56 is automatically assigned to the "game" program identifier stored in the "requested" file. At an operation 106, the identifier of the "game" application is stored in the "active" file. The identifier of the "dart" application remains stored in the "recent" file.

At an operation 108, the "dart" application is uninstalled from the device 30. At an operation 110, the MMC storing the "game" program is removed from the device 30, without rebooting the device 30. At an operation 112, the left soft key button 56 is automatically assigned to the "camera" program identifier stored in the "default" file. At an operation 114, the identifier of the "camera" application is stored in the "active" file. The identifier of the "game" application remains stored in the "requested" file and the identifier of the "dart" application remains stored in the "recent" file.

Thus, the device remembers two previously selected applications ("requested" as the most current selection and "recent" as the second most current selection) in case a memory hot swap occurs. The user can change the applications to any of the shortcut keys. For example, the five-way scroll button 54, the left soft key button 56, and the right soft key button 58 provide seven shortcut keys, and the device 30 intelligently remembers the two last associations to each key including the applications executed from a memory inserted in the memory interface 40.

Some services in the Module Object Request Broker (ORB) support a mechanism that makes it possible to register Common ORB Architecture (CORBA) objects as event observers. Using observers removes the need to do frequent polling to identify the occurrence of an event. In an exemplary embodiment, these observers identify when an MMC is removed or an application is deleted from the device 30. When an event occurs, the service in the Module ORB creates a callback that is routed to an event handler in the utility 46.

It is understood that the invention is not confined to the particular embodiments set forth herein as illustrative, but embraces all such modifications, combinations, and permutations as come within the scope of the following claims. Thus, the description of the exemplary embodiments is for purposes of illustration and not limitation.

What is claimed is:

1. A computerized method for maintaining a shortcut key to an application accessible at a device, the method comprising:

assigning a first application to a shortcut key at a device;

storing an identifier of the first application to a first file at the device;

in response to detecting a change in which applications are stored on the device, determining if the first application at the device assigned to the shortcut key remains executable at the device; and if the first application is determined to be unexecutable at the device, assigning a second application to the shortcut key at the device, wherein an identifier of the second application is stored in a second file at the device, the second file indicating that the second application was recently selected by a user, wherein the second application is executable at the device, and wherein the second application is assigned based upon the indication that the second application was recently selected by the user.

2. The method of claim 1, further comprising:

storing an identifier of a third application to a third file at the device;

selecting the identifier of the third application from the third file if neither the first application nor the second application is executable at the device; and assigning the third application to the shortcut key at the device if neither the first application nor the second application is executable at the device.

3. The method of claim 1, further comprising:

if the first application is determined to be unexecutable at the device, assigning the first application to the shortcut key at the device if the first application subsequently is determined to be executable at the device.

4. The method of claim 1, upon a request from a user to assign a third application to the shortcut key, assigning the identifier of the third application to the first file and assigning the identifier of the first application to the second file, wherein the third application is assigned to the shortcut key if the third application is executable at the device, or the first application is assigned to the shortcut key if the third application is unexecutable at the device but the first application is executable at the device.

5. The method of claim 1, wherein the first application executes from a multi-media card.

6. The method of claim 1, wherein the shortcut key comprises a scroll key.

7. The method of claim 6, wherein the scroll key comprises a five-way scroll key.

8. The method of claim 1, wherein the shortcut key is a button on the device but is not a button included with a numeric keypad at the device.

9. One or more computer-readable media having computer-readable instructions stored thereon that, upon execution by a processor, cause the processor to maintain a shortcut key to an application accessible at a device, the instructions configured to assign a first application to a shortcut key at a device;

store an identifier of the first application to a first file at the device;

in response to detecting a change in which applications are stored on the device, determine if the first application at the device assigned to the shortcut key remains executable at the device;

if the first application is determined to be unexecutable at the device, assign a second application to the shortcut key at the device, wherein an identifier of the second application is stored in a second file at the device, the second file indicating that the second application was recently selected by a user, wherein the second application is executable at the device, and wherein the second application is assigned based upon the indication that the second application was recently selected by the user.

10. The computer readable media of claim 9, further comprising computer readable instructions configured for:

storing an identifier of a third application to a third file at the device;

selecting the identifier of the third application from the third file if neither the first application nor the second application is executable at the device; and assigning the third application to the short cut key at the device if neither the first application nor the second application is executable at the device.

11. The computer readable media of claim 9, further comprising computer readable instructions configured for:

if the first application is determined to be unexecutable at the device, assigning the first application to the shortcut key at the device if the first application subsequently is determined to be executable at the device.

12. The computer readable media of claim 9, further comprising computer readable instructions configured for upon a request from a user to assign a third application to the shortcut key, assigning the identifier of the third application to the first file, assigning the identifier of the first application to the second file, wherein the third application is assigned to the shortcut key if the third application is executable at the device, or the first application is assigned to the shortcut key if the third application is unexecutable at the device but the first application is executable at the device.

13. A device for maintaining a shortcut key to an application accessible at a device, the device comprising:

a shortcut key;

a first file;

a second file;

a first application, wherein the first application is removable from the device;

a second application;

a utility, the utility comprising computer code configured to:

assign the first application to the shortcut key;

store an identifier of the first application to the first file;

in response to detecting a change in which applications are stored on the device, determine if the first application assigned to the shortcut key remains executable at the device; and if the first application is determined to be unexecutable at the device, assign the second application to the shortcut key, wherein an identifier of the second application is stored in the second file, the second file indicating that the second application was recently selected by a user, wherein the second application is executable at the device, and wherein the second application is assigned based upon the indication that the second application was recently selected by the user;

a memory, wherein the memory stores the utility, the first file, and the second file; and a processor, the processor coupled to the memory and configured to execute the utility.

14. The device of claim 13, wherein the utility further comprising computer code configured for:

storing an identifier of a third application to a third file at the device;

selecting the identifier of the third application from the third file if neither the first application nor the second application is executable at the device; and assigning the third application to the shortcut key at the device if neither the first application nor the second application is executable at the device.

15. The device of claim 13, wherein the utility further comprising computer code configured for:

if the first application is determined to be unexecutable at the device, assigning the first application to the shortcut key at the device if the first application subsequently is determined to be executable at the device.

16. The device of claim 13, wherein the utility further comprising computer code configured for upon a request from a user to assign a third application to the shortcut key, assigning the identifier of the third application to the first file, assigning the identifier of the first application to the second file, wherein the third application is assigned to the shortcut key if the third application is executable at the device, or the first application is assigned to the shortcut key if the third application is unexecutable at the device but the first application is executable at the device.

* * * * *